(12) United States Patent
Smits et al.

(10) Patent No.: US 8,821,784 B2
(45) Date of Patent: *Sep. 2, 2014

(54) BOTTLES PREPARED FROM COMPOSITIONS OF POLYPROPYLENE AND INORGANIC NUCLEATING AGENTS

(75) Inventors: Valerie Smits, Lobbes (BE); Emmanuel Humbeeck, Feluy (BE); Kristien Roegiers, Wolvertem (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 655 days.

This patent is subject to a terminal disclaimer.

(21) Appl. No.: 11/793,510

(22) PCT Filed: Dec. 21, 2005

(86) PCT No.: PCT/EP2005/057020
§ 371 (c)(1),
(2), (4) Date: Mar. 26, 2008

(87) PCT Pub. No.: WO2006/067178
PCT Pub. Date: Jun. 29, 2006

(65) Prior Publication Data
US 2008/0246193 A1    Oct. 9, 2008

(30) Foreign Application Priority Data

Dec. 21, 2004 (EP) .................................. 04106762

(51) Int. Cl.
*B29C 49/06* (2006.01)
*B29C 49/12* (2006.01)
(Continued)

(52) U.S. Cl.
CPC ..... *C08K 5/0083* (2013.01); *B29B 2911/14713* (2013.01); *B29B 2911/14886* (2013.01); *B29B 2911/14026* (2013.01); *B29B 2911/14133* (2013.01); *B29B 11/14* (2013.01); *B29K 2025/00* (2013.01); *B29K 2023/12* (2013.01); *B29K 2067/00* (2013.01); *B29C 49/0005* (2013.01); *B29B 2911/1404* (2013.01); *B29B 11/08* (2013.01); *B29B 2911/14726* (2013.01); *B29B 2911/14333* (2013.01); *B29C 49/12* (2013.01); *B29B 2911/14693* (2013.01); *B29B 2911/14033* (2013.01); *B29K 2105/258* (2013.01); *B29B 2911/14106* (2013.01); *B29C 49/6445* (2013.01); *B29K 2023/06* (2013.01); *B29B 2911/1402* (2013.01); *B29B 2911/1476* (2013.01); *B29C 49/06* (2013.01); *B29B 2911/14753* (2013.01); *B29B 2911/1488* (2013.01); *B29B 2911/1444* (2013.01); *B29B 2911/14686* (2013.01); *B29K 2027/06* (2013.01); *B29B 2911/14466* (2013.01); *B29B 2911/14326* (2013.01)
USPC .......................................... 264/532; 264/535

(58) Field of Classification Search
USPC .................................................. 264/532, 535
See application file for complete search history.

(56) References Cited

U.S. PATENT DOCUMENTS 5,342,868 A    8/1994 Kimura et al.
(Continued)

FOREIGN PATENT DOCUMENTS

EP    0 151 741    8/1985
(Continued)

OTHER PUBLICATIONS

Experimental Report filed by Opponent 1—updated, Investigaton of Haze Properties of Bottles Mde from Nucleated rPP and Producted in 2-step ISBM in view of EP1827796B1.
(Continued)

*Primary Examiner* — Ryan Ochylski

(57) ABSTRACT

This invention discloses bottles and pre-forms prepared by injection-stretch-blow-molding (ISBM) from a composition comprising polypropylene and an inorganic non-sorbitol nucleating agent.

8 Claims, 1 Drawing Sheet

Figure 1:
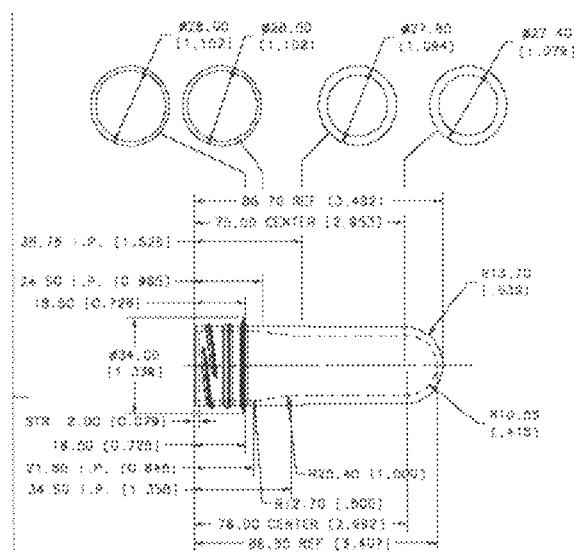

(51) Int. Cl.
*C08K 5/00* (2006.01)
*B29C 49/00* (2006.01)
*B29B 11/14* (2006.01)
*B29K 25/00* (2006.01)
*B29K 23/00* (2006.01)
*B29K 67/00* (2006.01)
*B29B 11/08* (2006.01)
*B29K 105/00* (2006.01)
*B29C 49/64* (2006.01)
*B29K 27/06* (2006.01)

(56) References Cited

U.S. PATENT DOCUMENTS

| | | | |
|---|---|---|---|
| 6,077,907 | A | 6/2000 | Raetzsch et al. |
| 6,159,567 | A * | 12/2000 | Charlier et al. .............. 428/36.9 |
| 6,733,717 | B1 | 5/2004 | Marczinke et al. |
| 2005/0161866 | A1* | 7/2005 | Batlaw et al. ................. 264/537 |
| 2006/0147664 | A1* | 7/2006 | Richards et al. ............. 428/35.7 |

FOREIGN PATENT DOCUMENTS

| | | |
|---|---|---|
| EP | 0 309 138 | 3/1989 |
| EP | 0 556 829 | 8/1993 |
| EP | 1533102 A1 | 5/2005 |
| EP | 1674238 A1 | 6/2006 |
| WO | 99/41293 A1 | 8/1999 |
| WO | 2005/074428 A2 | 8/2005 |
| WO | 2006/018813 A1 | 2/2006 |
| WO | 2006/044187 A1 | 2/2006 |

OTHER PUBLICATIONS

K. Esser and G. Menges, "Influence of Processing Parameters on the Properties of Stretch Blow Moulded PP", ANTEC '84, 1984, p. 924-926.

Lilli Manolis Sherman (Ed.), "New Clarifiers & Nucleators" in www.plasticstechnology.com, Jul. 2002, p. 44-49.

Bormed RD808CF, Product Data Sheet by Borealis.

Cinquasia Gold L 2929 (old Cinquasia Glod Yt-923-D) in www.specialchem4coatings.com.

Communication issued in European Application No. 05825220.6-1301 dated May 9, 2014, 10 pages.

Supplementary Experimental Data, Annex to a letter of Total Petrochemicals Research Feluy during prosecution of the application EP 05825220.6 dated May 30, 2011.

Blasformen von Polypropylen, Ed. Verein Deutscher Ingenieure VDI-Gesellschaft Kunststofftechnik, VDI_verlag GmbH, Desseldorf 1980, p. 68-71.

\* cited by examiner

BOTTLES PREPARED FROM COMPOSITIONS OF POLYPROPYLENE AND INORGANIC NUCLEATING AGENTS

This invention relates to the field of bi-oriented bottles having high transparency and prepared from compositions comprising polypropylene (PP) and inorganic nucleating agents.

Presently, the most common material used in injection-stretch-blow-moulding (ISBM) is polyethylene terephthalate (PET). It has the advantage of achieving very short cycle time of the order of 1500 bottles per cavity per hour and it offers the further advantage of having excellent optical properties. It suffers from the considerable disadvantage of being very costly.

Alternatively other thermoplastic materials such as for example polyvinylchloride (PVC), polystyrene, acrylonitrile, polypropylene and acetals could be used. Among those, polypropylene prepared with a Ziegler-Natta catalyst system has been used. In order to obtain the required transparency, these resins are clarified with sorbitols and the injection melt temperature for the production of the pre-form must be very high. That impacts negatively the cycle time and the economics.

There is thus a need to replace the costly PET resins with other resins that will not suffer from the disadvantages of the sorbitol-clarified polypropylene prepared with a Ziegler-Natta catalyst system.

It is an aim of the present invention to provide resins that are processed at a reduced temperature for the production of the pre-form while keeping good transparency of the final bottles.

It is also an aim of the present invention to provide resins that can be processed for pre-form injection with a very short cycle time.

It is another aim of the present invention to provide resins that can be used to prepare pre-forms having excellent optical properties after bi-stretching.

It is further aim of the present invention to provide resins that have a broad processing window in injection-stretch-blow-moulding.

Accordingly, the present invention provides pre-forms and bottles produced by injection-stretch-blow-moulding (ISBM) prepared from a composition consisting of polypropylene and an inorganic non-sorbitol nucleating or clarifying agent.

The pre-forms are prepared by injecting the resin at a temperature that can be lower than that typically used with polypropylene resins. It is at least 10° C., preferably 20° C., lower than that used in the prior art production. Typical pre-form injection temperatures are of from 190 to 235° C., preferably of from 210 to 235° C., more preferably of from 210 to 220° C., most preferably of about 215° C. Alternatively, the resin can be injected at temperatures of from 235 to 300° C., preferably of from 235 to 260° C.

The polypropylene used in the present invention may be prepared with a Ziegler-Natta (ZN) or a metallocene catalyst system and it may be a homopolymer or a random copolymer of propylene. Preferably the resin is prepared with a Ziegler-Natta catalyst system. Preferably, it has a melt index of from 2 to 100 g/10 min and preferably of from 10 to 20 g/10 min. When it is a copolymer of propylene, the preferred comonomer is ethylene and the amount of ethylene present in the resin is of up to 20 wt %, based on the weight of polymer, for block copolymers and of up to 10 wt %, preferably of up to 4 wt % for random copolymers. The amount of ethylene in the copolymer is measured by NMR.

The melt flow index MFI is measured using the procedures of standard test ISO 1133 at 230° C. for polypropylene resins and under a load of 2.16 kg.

The nucleating agents that can be used at the reduced pre-form injection temperature of the present invention without reducing the optical properties of the finished articles, are selected from sodium salts, lithium salts, phosphate salts, aluminium salts, sodium or lithium benzoate, talc or combinations thereof.

The amount of nucleating agent varies with the nature of the agent: it is of up to 10000 ppm, preferably of up to 2000 ppm and in some cases of less than 1000 ppm.

LIST OF FIGURES

Figure 2:
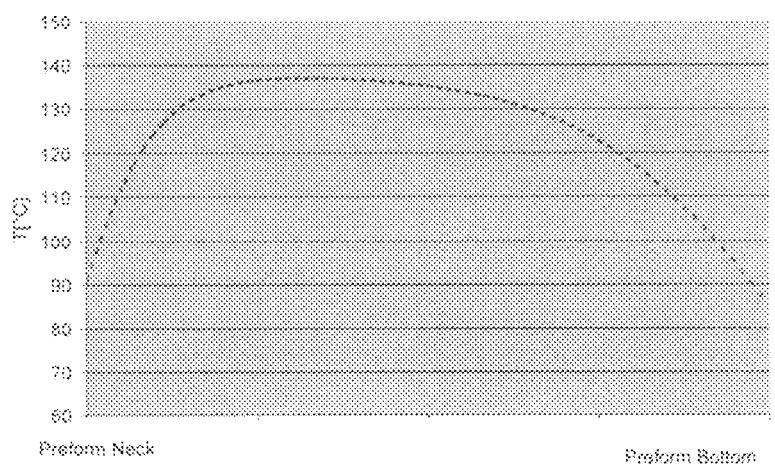

FIG. 1 represents a typical pre-form design.
FIG. 2 represents a typical pre-form temperature profile after re-heating for the stretching step.

The injection-stretch-blow-moulding can be carried out either in a two-step process or in a single step process. The two-step process is generally preferred and it is carried out in two separate locations. It comprises the steps of:
  providing a pre-form by injection moulding on a multi-cavity mould;
  cooling the pre-form to room temperature;
  transporting the pre-form to the blow moulding machine;
  re-heating the pre-form in the blow moulding machine in a reflective radiant heat oven following a pre-determined temperature profile for the pre-form;
  optionally, passing the heated pre-form through an equilibrium zone to allow the heat to disperse evenly through the pre-form wall;
  stretching the pre-form axially by a centre rod;
  orienting the stretched pre-form radially by high pressure air.

In this process, the stretching step is the critical step as it requires re-heating of the pre-form: optimisation of the pre-form is thus required. A typical example of pre-form design is displayed in FIG. 1.

The pre-forms are re-heated in an infra-red oven following a heating profile such as displayed for example in FIG. 2. Typical re-heating temperatures are of from 90 to 140° C. as shown in FIG. 2.

In the single-step process, all steps are carried out in the same machine. The cooling step, the transporting step and the reheating step are thus replaced by a single conditioning step that consists in slightly re-heating the pre-form following the temperature profile required for the stretching step.

The stretching is then carried out under a blowing pressure is of from 10 to 40 bars, preferably of from 12 to 18 bars and most preferably of about 15 bars and with a stretch rod speed of from 1000 to 2000 mm/s, preferably of from 1400 to 1800 mm/s and most preferably of about 1600 mm/s.

The articles prepared according to the present invention are hollow containers and bottles that can be used in various food and non-food applications and in hot-fill applications. The food applications comprise the storage of water, juices, oil, flavoured still beverages, isotonic drinks, dry products, fresh milk and solid food. The non-food applications comprise the storage of cosmetic and pharmaceutical products, dishwashing or washing detergent, household chemicals and dry products.

EXAMPLES

Several propylene copolymers were tested. They were all prepared with a Ziegler-Natta catalyst system and their properties and comonomer content are summarised in Table I. They were additivated with a commercial antioxydants and antiacid package and additionally with various inorganic nucleating agents: their nature and amount is also specified in Table I. Resins R1 to R3 were comparative resins, and resin R4 was prepared according to the present invention.

TABLE I

|  | Resin | | | |
| --- | --- | --- | --- | --- |
|  | R1 | R2 | R3 | R4 |
| MFI (dg/min) | 11.4 | 11 | 9.4 | 11 |
| C2 (%) | 3.3 | 3.1 | 3.8 | 3.1 |
| nucleating agent | none | Irgaclear D | Millad 3988 | Na-21 |
| amount NA (%) | 0 | 2200 | 1900 | 1400 |

The pre-form injection step was carried out on a Arburg press using respectively injection temperatures of 215° C. and 235° C. The blowing step was carried out on a separate injection-stretch-blow-moulding machine. The re-heating step was performed in an infra-red oven according to the profile displayed in FIG. 2 and the number of bottles produced per hour and per cavity was of 1200. The temperature profile was the same for all the tested pre-forms.

The haze results are displayed in Table II for different pre-form injection temperatures.

TABLE II

| Pre-form injection Temperature | R1 | R2 | R3 | R4 |
| --- | --- | --- | --- | --- |
| 215° C. | 15% | 25.6% | 22.1% | 8.1% |
| 235° C. | 4.1% | 5.2% | 6.3% | 5.7% |

As can be seen from these results, all nucleating agents performed well and similarly at the pre-form injection temperature of 235° C. and gave excellent haze values. When the pre-form injection temperature was reduced to 215° C., the haze values became prohibitively high for all the polypropylene resins that were not additivated or that were additivated with sorbitol nucleating agents. The resins according to the present invention kept excellent haze values when the pre-forms were injected at a temperature of 215° C., thus 20° C. lower than typical temperatures. This resulted in considerable savings in time and energy.

The invention claimed is:

1. A process for preparing bottles with a two-machine system comprising the steps of:
   a. providing a composition comprising polypropylene, prepared with a Ziegler-Natta catalyst system and a non-sorbitol nucleating or clarifying agent comprising aluminum hydroxybis{2,2'-methylenebis[4,6-di(tert-butyl)phenyl]phosphate};
   b. preparing a pre-form by injection moulding on a multi-cavity mould at injection temperature of 215° C.;
   c. cooling the pre-form at room temperature;
   d. transporting the pre-form to the blow-moulding machine;
   e. re-heating the pre-form in the blow-moulding machine to a temperature of from 90 to 140° C., following a pre-determined temperature profile;
   f. passing the re-heated pre-form through an equilibrium zone;
   g. stretching the pre-form axially with a centre rod having a speed of 1400 to 1800 mm/s;
   h. blowing the stretched pre-form radially with high-pressure air;
   i. retrieving bottles having low haze values.

2. The process of claim 1 wherein the resin has a melt flow rate of from 10 to 20 dg/min.

3. The process of claim 1 wherein the amount of non-sorbitol nucleating or clarifying agent is of up to 10000 ppm.

4. The process of claim 3 wherein the amount of non-sorbitol nucleating or clarifying agent is of up to 2000 ppm.

5. The process of claim 1 wherein the polypropylene is a homo- or a co-polymer of propylene.

6. The process of claim 5 wherein the polypropylene is a copolymer of propylene, wherein the comonomer is ethylene and wherein the amount of comonomer is of up to 20 wt % based on the weight of the polymer for block copolymers.

7. The process of claim 5 wherein the polypropylene is a copolymer of propylene, wherein the comonomer is ethylene and wherein the amount of comonomer is of up to 10 wt %, preferably up to 4 wt %, based on the weight of the polymer, for random copolymers.

8. The process of claim 1, wherein the bottle is adapted for hot-fill applications.

* * * * *